United States Patent
Chen et al.

(10) Patent No.: US 10,873,460 B2
(45) Date of Patent: Dec. 22, 2020

(54) UAV AUTHENTICATION METHOD AND SYSTEM

(71) Applicant: SZ DJI TECHNOLOGY CO., LTD., Shenzhen (CN)

(72) Inventors: Yongsen Chen, Shenzhen (CN); Ming Gong, Shenzhen (CN); Ming Chen, Shenzhen (CN); Zhun Ding, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 92 days.

(21) Appl. No.: 16/003,799

(22) Filed: Jun. 8, 2018

(65) Prior Publication Data

US 2018/0294964 A1    Oct. 11, 2018

Related U.S. Application Data (63) Continuation of application No. PCT/CN2015/097046, filed on Dec. 10, 2015.

(51) Int. Cl.
*H04L 9/32* (2006.01)
*G08G 5/00* (2006.01)
(Continued)

(52) U.S. Cl.
CPC ............ *H04L 9/3228* (2013.01); *G06F 21/44* (2013.01); *G06F 21/73* (2013.01); *G08G 5/0013* (2013.01);
(Continued)

(58) Field of Classification Search
CPC ... H04L 9/3228; H04L 9/0822; H04L 9/0833; H04L 9/3271; H04L 63/0428;
(Continued)

(56) References Cited

U.S. PATENT DOCUMENTS

| | | | | |
|---|---|---|---|---|
| 5,196,840 A | * | 3/1993 | Leith | ............... G06Q 20/4012 340/5.26 |
| 5,937,067 A | * | 8/1999 | Thatcher | ............ H04N 7/1675 348/E7.056 |

(Continued)

FOREIGN PATENT DOCUMENTS

| | | | |
|---|---|---|---|
| CN | 102638794 B | * | 3/2007 |
| CN | 101378320 A | | 3/2009 |

(Continued)

OTHER PUBLICATIONS

Abdulhadi Shoufan, Continuous authentication of UAV flight command data using behaviometrics, 2017 IFIP/IEEE International Conference on Very Large Scale Integration (VLSI-SoC), Oct. 2017, pp. 1-6.*

(Continued)

*Primary Examiner* — Farid Homayounmehr
*Assistant Examiner* — Raied A Salman
(74) *Attorney, Agent, or Firm* — Anova Law Group, PLLC (57) ABSTRACT

An authentication method includes that an authentication apparatus of an unmanned aerial vehicle (UAV) generates a session key, the authentication apparatus receives a device identification (ID) of a device and a randomly generated random number from the device of the UAV, the authentication apparatus obtains a device key of the device according to the device ID of the device, the authentication apparatus encrypts the session key and the random number according to the device key of the device, and the authentication apparatus sends the encrypted session key and the encrypted random number to the device.

19 Claims, 8 Drawing Sheets

(51) Int. Cl.
    *G06F 21/73*     (2013.01)
    *G06F 21/44*     (2013.01)
    *H04L 29/06*     (2006.01)
    *H04L 9/08*     (2006.01)
    *B64C 39/02*     (2006.01)

(52) U.S. Cl.
CPC ......... *G08G 5/0021* (2013.01); *G08G 5/0069* (2013.01); *H04L 9/0822* (2013.01); *H04L 9/0833* (2013.01); *H04L 9/3271* (2013.01); *H04L 63/0428* (2013.01); *H04L 63/0869* (2013.01); *H04L 63/123* (2013.01); *B64C 39/024* (2013.01)

(58) Field of Classification Search
CPC . H04L 63/0869; H04L 63/123; H04L 9/3247; H04L 9/0825; H04L 63/0442; H04L 63/126; H04L 9/3242; G06F 21/44; G06F 21/73; G08G 5/0013; G08G 5/0021; G08G 5/0069; B64C 39/024
See application file for complete search history.

(56) References Cited

U.S. PATENT DOCUMENTS

| | | | | |
|---|---|---|---|---|
| 6,556,679 | B1* | 4/2003 | Kato | G11B 20/00086 380/203 |
| 8,644,512 | B2* | 2/2014 | Khazan | H04W 56/0045 380/258 |
| 8,938,792 | B2* | 1/2015 | Koeberl | G06F 21/73 726/10 |
| 9,183,357 | B2* | 11/2015 | Harada | H04L 9/0891 |
| 9,412,278 | B1* | 8/2016 | Gong | G06F 16/29 |
| 9,766,322 | B2* | 9/2017 | Taylor, Jr. | G01S 5/0226 |
| 9,836,047 | B2* | 12/2017 | Clark | G05D 1/0022 |
| 9,959,403 | B2* | 5/2018 | Sugahara | G06F 21/10 |
| 9,984,522 | B2* | 5/2018 | Ricci | B60L 50/53 |
| 2003/0053629 | A1* | 3/2003 | Knapen | H04L 9/0844 380/277 |
| 2004/0218762 | A1* | 11/2004 | Le Saint | H04L 9/0825 380/277 |
| 2010/0332832 | A1* | 12/2010 | Wu | H04L 9/3271 713/169 |
| 2013/0129093 | A1* | 5/2013 | Patel | H04L 63/061 380/270 |
| 2013/0191927 | A1* | 7/2013 | Miura | G06Q 10/101 726/26 |
| 2014/0157374 | A1* | 6/2014 | Kato | H04L 63/0853 726/4 |
| 2015/0188704 | A1* | 7/2015 | Takenaka | H04L 9/3236 713/171 |
| 2015/0195258 | A1* | 7/2015 | Kohiyama | G06F 21/10 713/168 |
| 2015/0222439 | A1* | 8/2015 | Bhattacharya | H04W 4/70 713/169 |
| 2017/0063853 | A1* | 3/2017 | Lim | H04L 9/3242 |
| 2017/0070353 | A1* | 3/2017 | Suwirya | H04L 9/14 |
| 2017/0288872 | A1* | 10/2017 | Lu | H04L 63/00 |
| 2018/0176230 | A1* | 6/2018 | Wei | H04L 29/06 |
| 2018/0340466 | A1* | 11/2018 | Li | F02B 33/18 |
| 2019/0103030 | A1* | 4/2019 | Banga | G08G 5/0013 |

FOREIGN PATENT DOCUMENTS

| | | | | |
|---|---|---|---|---|
| CN | 101782891 | A | | 7/2010 |
| CN | 102638794 | A | | 8/2012 |
| CN | 105162772 | A | * | 8/2015 |
| CN | 105162772 | A | * | 12/2015 |
| CN | 105162772 | A | | 12/2015 |
| CN | 106603234 | A | * | 4/2017 ........... H04L 9/3228 |
| CN | 108989020 | A | * | 12/2018 |
| KR | 101031977 | B1 | | 4/2011 |
| KR | 101475629 | B1 | * | 11/2013 |
| RU | 2704268 | C1 | * | 10/2019 |
| WO | WO-2011082150 | A1 | * | 12/2009 |

OTHER PUBLICATIONS

Kirill Borisov, et al., Adaptation of an authentication protocol based on asymmetric keys for use in UAV C2 link security systems, SIN '19: Proceedings of the 12th International Conference on Security of Information and Networks, Sep. 2019, Article No. 21 pp. 1-4.*
The World Intellectual Property Organization (WIPO) International Search Report for PCT/CN2015/097046 dated Aug. 30, 2016 5 Pages (including translation).

* cited by examiner

UAV AUTHENTICATION METHOD AND SYSTEM

CROSS-REFERENCE TO RELATED APPLICATION

This application is a continuation application of International application Ser. No. PCT/CN2015/097046, filed on Dec. 10, 2015, the entire contents of which are incorporated herein by reference.

TECHNICAL FIELD

The present disclosure relates to unmanned aerial vehicle (UAV) security technology and, more particularly, to a UAV authentication method and system.

BACKGROUND

An unmanned aerial vehicle (UAV) is an unmanned aircraft controlled by a radio remote control device and a programming control device of the UAV. Currently, when the UAV is powered up or reset, components of the UAV are started without authentication. When a component of the UAV is replaced, the replaced component is started without authentication. The replaced component can carry out an attack, causing security risks.

SUMMARY

In accordance with the disclosure, there is provided an authentication method including that an authentication apparatus of an unmanned aerial vehicle (UAV) generates a session key, the authentication apparatus receives a device identification (ID) of a device and a randomly generated random number from the device of the UAV, the authentication apparatus obtains a device key of the device according to the device ID of the device, the authentication apparatus encrypts the session key and the random number according to the device key of the device, and the authentication apparatus sends the encrypted session key and the encrypted random number to the device.

Also in accordance with the disclosure, there is provided a secure communication method including that a first device obtains a session key and a command sequence number, the first device generates a message request to communicate with a second device, the first device updates the command sequence number, the first device encrypts the message request and performs message authorization code (MAC) computation on the message request, and the first device sends the encrypted and MAC-computed message request and the updated command sequence number to the second device.

Also in accordance with the disclosure, there is provided a flight controller of an unmanned aerial vehicle (UAV). The flight controller is configured to generate a session key, receive a device ID of a functional assembly of the UAV and a random number, obtain a device key of the functional assembly according to the device ID of the functional assembly, encrypt the session key and the random number according to the device key of the functional assembly, and send the encrypted session key and the encrypted random number to the functional assembly.

DESCRIPTION OF MAIN COMPONENTS AND REFERENCE NUMERALS

UAV 1
UAV authentication system 10
Authentication apparatus 11
Device 12
Storage apparatus 13
Controller 14
Generating circuit 100
First receiving circuit 101
Acquisition circuit 102
Encryption circuit 103
First sending circuit 104
First determination circuit 105
Second sending circuit 106
Second receiving circuit 107
Decryption circuit 108
Second determination circuit 109
First device 61
Second device 62

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings.

Figure 1:
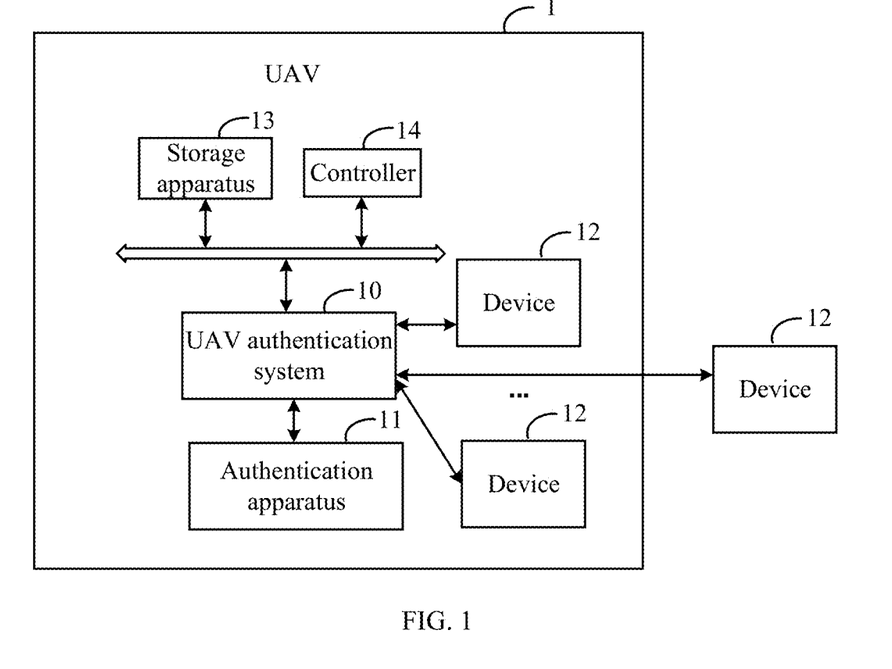
FIG. 1 is a schematic diagram of an application environment of an unmanned aerial vehicle (UAV) authentication system according to the disclosure.

FIG. 1 is a schematic diagram of an application environment of an unmanned aerial vehicle (UAV) authentication system 10 consistent with the disclosure.

As shown in FIG. 1, the UAV authentication system 10 is provided in a UAV 1. The UAV 1 also includes an authentication apparatus 11, at least one device 12, a storage apparatus 13, a controller 14, or the like. The authentication apparatus 11 can include a flight controller of the UAV 1. In some embodiments, the UAV authentication system 10 can be a separate system coupled to the authentication apparatus 11 and the at least one device 12. In some other embodiments, the UAV authentication system 10 can be integrated in the authentication apparatus 11 and the at least one device 12. The authentication apparatus 11, the storage apparatus 13, and the controller 14 can be integrated in the flight controller of the UAV 1. The flight controller (not shown in FIG. 1) of the UAV 1 can be arranged at a fuselage of the UAV 1. The at least one device 12 can include a plurality of components of the UAV 1 or a plurality of functional assemblies of the UAV 1. For example, the plurality of functional assemblies may include one or more of a camera, a gimbal, a remote controller, and a positioning apparatus.

In some embodiments, each of the at least one device 12 corresponds to a unique device identification (ID) that is used for identifying each of the at least one device 12. In some embodiments, the at least one device 12 can be divided into a plurality of groups, for example, a first group of devices, a second group of devices, . . . , an Nth group of devices, or the like. Each group of devices can include at least one functional assembly. For example, the first group of devices can include a camera, camera-associated components and/or similar components, or the like; the second group of devices can include a gimbal, gimbal-associated components and/or similar components, or the like; and the third group of devices can include a remote controller, remote controller-associated components and/or similar components, or the like. Each group of devices corresponds to a device type. Each device type corresponds to a unique device type ID that is used for identifying each group of devices.

Figure 2:
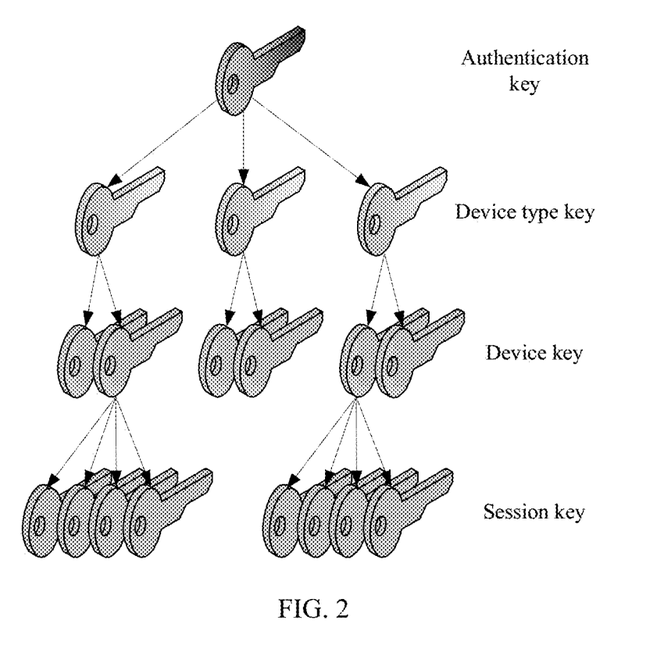
FIG. 2 is a schematic diagram of a multi-layered key according to the disclosure.

FIG. 2 is a schematic diagram of a multi-layered key consistent with the disclosure. The authentication apparatus 11 corresponds to a unique authentication key. Each device type corresponds to a device type key, and each of the at least one device 12 corresponds to a device key. Each device type key can be generated according to the device type ID of the corresponding each device type. The device key of each of the at least one device 12 can be generated, according to the corresponding device ID, the authentication key, and the device type key of the device type to which each of the at least one device 12 belongs. When the authentication apparatus 11 performs communication authentication with each of at least one device 12, a session key can be established.

In some embodiments, there is no need to divide the at least one device 12 into the plurality of groups. The device key of each of the at least one device 12 can be directly generated based on the corresponding device ID and the authentication key.

In some embodiments, the device key of each of the at least one device 12 can be generated by a server during a generating process, according to the above-described processes. After being generated, the device key of each of the at least one device 12 can be pre-programmed in a chip of the UAV 1 and/or be solidified in a firmware of the UAV 1. As such, the security of the UAV 1 can be increased.

In some embodiments, the controller 14 can be configured to implement and process various types of message commands and data of the UAV 1. The storage apparatus 13 can be configured to store various types of data of the UAV 1. In some embodiments, the storage apparatus 13 may be a memory externally connected to the UAV 1 or may be a flash memory.

Figure 3:
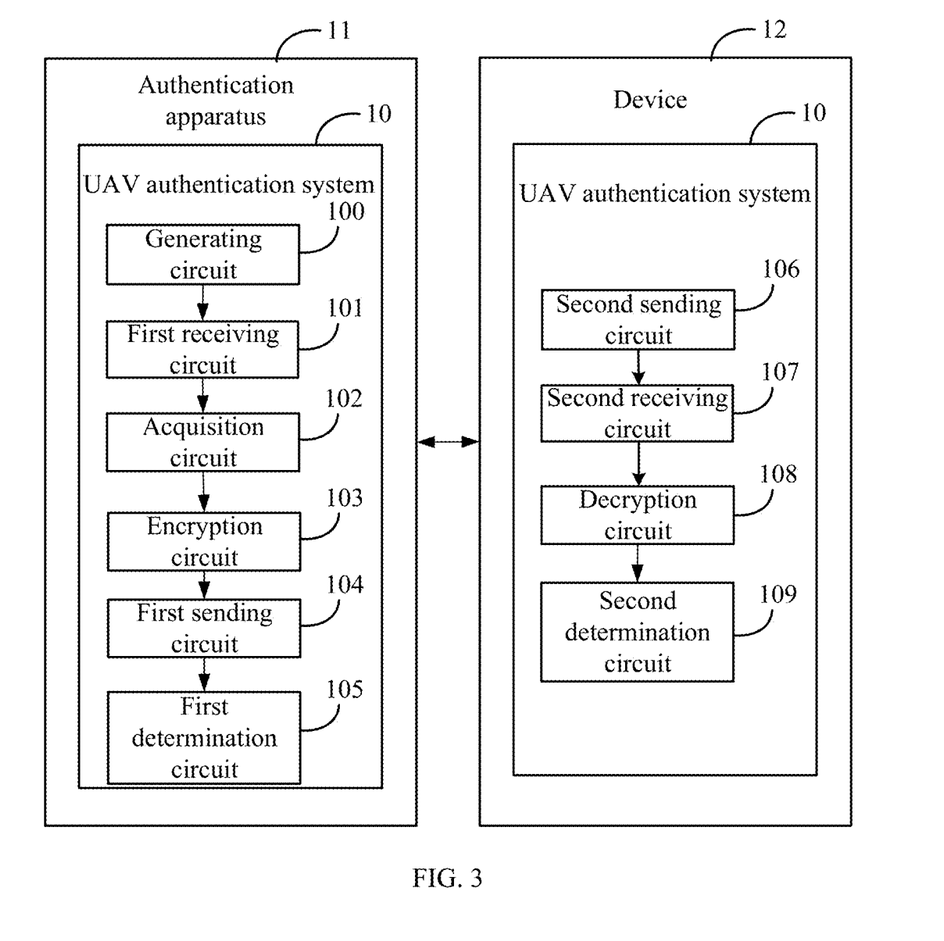
FIG. 3 is a block diagram of a UAV authentication system according to the disclosure.

FIG. 3 is a block diagram of the UAV authentication system 10 consistent with the disclosure. As shown in FIG. 3, the UAV authentication system 10 is divided into one or more circuits. In some embodiments, functions of the one or more circuits can be implemented by one or more software programs stored in the storage apparatus 13 and executed by one or more controllers (such as the controller 14), such that an authentication between the authentication apparatus 11 of the UAV 1 and each of the at least one device 12 described above can be achieved.

As shown in FIG. 3, the UAV authentication system 10 provided at the authentication apparatus 11 includes a generating circuit 100, a first receiving circuit 101, an acquisition circuit 102, an encryption circuit 103, a first sending circuit 104, and a first determination circuit 105. Furthermore, the UAV authentication system 10 provided at one of the at least one device 12 includes a second sending circuit 106, a second receiving circuit 107, a decryption circuit 108, and a second determination circuit 109.

Figure 4:
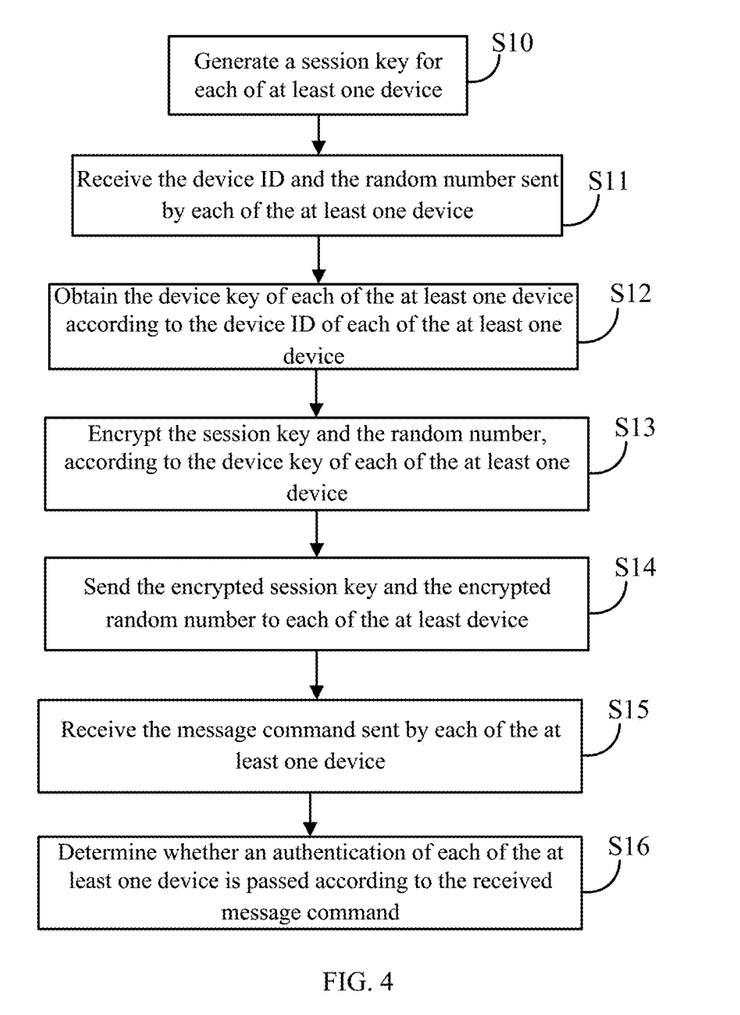
FIG. 4 is a flowchart of a UAV authentication method according to the disclosure.

FIG. 4 is a flowchart of a UAV authentication method consistent with the disclosure. FIG. 4 illustrates implementation processes of the UAV authentication system 10 at the authentication apparatus 11.

At S10, when the UAV 1 is powered up or reset, the generating circuit 100 generates a session key for each of the at least one device 12.

In some embodiments, each of the at least one device 12 can provide a randomly generated random number in a plaintext manner and send the device ID and the randomly generated random number to the authentication apparatus 11 in a plaintext manner.

At S11, the first receiving circuit 101 receives the device ID and the random number sent by each of the at least one device 12.

At S12, the acquisition circuit 102 obtains the device key of each of the at least one device 12 according to the device ID of each of the at least one device 12.

In some embodiments, the device key and the device ID of each of the at least one device 12 are stored in the storage apparatus 13. The acquisition circuit 102 can directly read the device key of each of the at least one device 12 from the storage apparatus 13, according to the device ID of each of the at least one device 12. In some embodiments, the acquisition circuit 102 can generate the device key of each of the at least one device 12, according to the device ID of each of the at least one device 12, the authentication key of the authentication apparatus 11, and the device type key of the device type to which each of the at least one device 12 belongs. In some other embodiments, when the at least one device 12 is not divided into the plurality of groups, the acquisition circuit 102 can directly generate the device key of each of the at least one device 12, according to the device ID of each of the at least one device 12 and the authentication key. In some embodiments, the device key is generated in real time.

At S13, the encryption circuit 103 encrypts the session key and the random number, according to the device key of each of the at least one device 12.

In some embodiments, the encryption circuit 103 can use an encryption algorithm for performing encryption. The encryption algorithm may be a Triple Data Encryption Algorithm (TDEA), an Advanced Encryption Standard (AES), or the like. An encryption mode can use Counter (CTR) mode, Galois/Counter Mode (GCM) mode, or another mode.

At S14, the first sending circuit 104 sends the encrypted session key and the encrypted random number to each of the at least one device 12.

In some embodiments, each of the at least one device 12 can decrypt the received encrypted session key and the received encrypted random number based on the device key of each of the at least one device 12. After decryption, each of the at least one device 12 can send a message command to the authentication apparatus 11 using the session key and the device key.

At S15, the first receiving circuit 101 receives the message command sent by each of the at least one device 12.

At S16, the first determination circuit 105 determines whether an authentication of each of the at least one device 12 is passed according to the received message command.

In some embodiments, the first determination circuit 105 may check whether the authentication of each of the at least one device 12 is passed by checking the received message command through a Cyclic Redundancy Check (CRC). The received message command can be checked for each of the at least one device 12. When an error is detected in the received message command, the first determining circuit 105 can determine that corresponding one of the at least one device 12 is not authenticated. When no error is detected in the received message command of each of the at least one device 12, the first determining circuit 105 can determine that each of the at least one device 12 is authenticated.

In some embodiments, the first determination circuit 105 can also determine whether the authentication of each of the at least one device 12 is passed by verifying an integrity of the message command using a Message Digest. The digest generated by the received message command can be compared with the digest generated by the message command sent by each of the at least one device 12. When the digest generated by the received message command is consistent with the digest generated by the message command sent by each of the at least one device 12, the first determination circuit 105 can determine that the authentication of each of the at least one device 12 is passed. When the digest generated by the received message command is inconsistent with the digest generated by the message command sent by each of the at least one device 12, the first determination circuit 105 can determine that the authentication of the at least one device 12 is failed.

In some embodiments, the CRC code and Message Digest can be used at the same time to verify the received message command.

In some other embodiments, the processes at S15 and S16 can be omitted.

Figure 5:
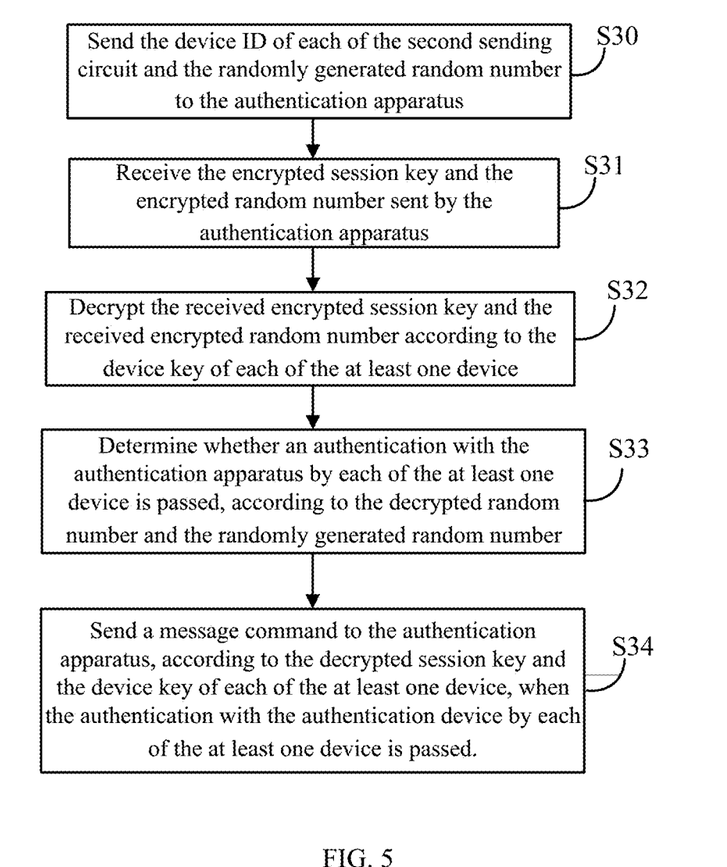
FIG. 5 is a flowchart of another UAV authentication method according to the disclosure.

FIG. 5 is a flowchart of another UAV authentication method consistent with the disclosure. FIG. 5 illustrates implementation processes of the UAV authentication system 10 at each of the at least one device 12.

At S30, when the UAV 1 is powered up or reset, the authentication apparatus 11 generates a session key for each of the at least one device 12, and each of the second sending circuit 106 sends the device ID of each of the second sending circuit 106 and the randomly generated random number to the authentication apparatus 11 in a plaintext manner.

In some embodiment, the authentication apparatus 11 can encrypt the session key and the random number according to the device key of each of the at least one device 12.

At S31, the second receiving circuit 107 of each of the at least one device 12 receives the encrypted session key and the encrypted random number sent by the authentication apparatus 11.

At S32, the decryption circuit 108 of each of the at least one device 12 decrypts the received encrypted session key and the received encrypted random number according to the device key of each of the at least one device 12.

In some embodiments, the decryption circuit 108 can use an encryption algorithm for encryption. The encryption algorithm may be a Triple Data Encryption Algorithm (TDEA), an Advanced Encryption Standard (AES), or the like.

At S33, the second determination circuit 109 of each of the at least one device 12 determines whether an authentication with the authentication apparatus 11 by each of the at least one device 12 is passed, according to the decrypted random number and the randomly generated random number.

In some embodiments, when the decrypted random number is the same as the randomly generated random number of each of the at least one device 12, the second determination circuit 109 can determine that the authentication with the authentication apparatus 11 by each of the at least one device 12 is passed and the process at S34 can be performed. When the decrypted random number is different from the randomly generated random number of one of the at least one device 12, the second determination circuit 109 can determine that the authentication with the authentication apparatus 11 by one of the at least one device 12 is failed.

At S34, the second sending circuit 106 sends a message command to the authentication apparatus 11.

In some embodiments, the second sending circuit 106 can process the message command, according to the decrypted session key and the device key of each of the at least one device 12 and can send the processed message command to the authentication apparatus 11. The authentication apparatus 11 can verify the integrity and correctness of the received message command using a cyclic redundancy check code and/or a Message Digest.

In some other embodiments, the process at S34 can be omitted.

Figure 6:
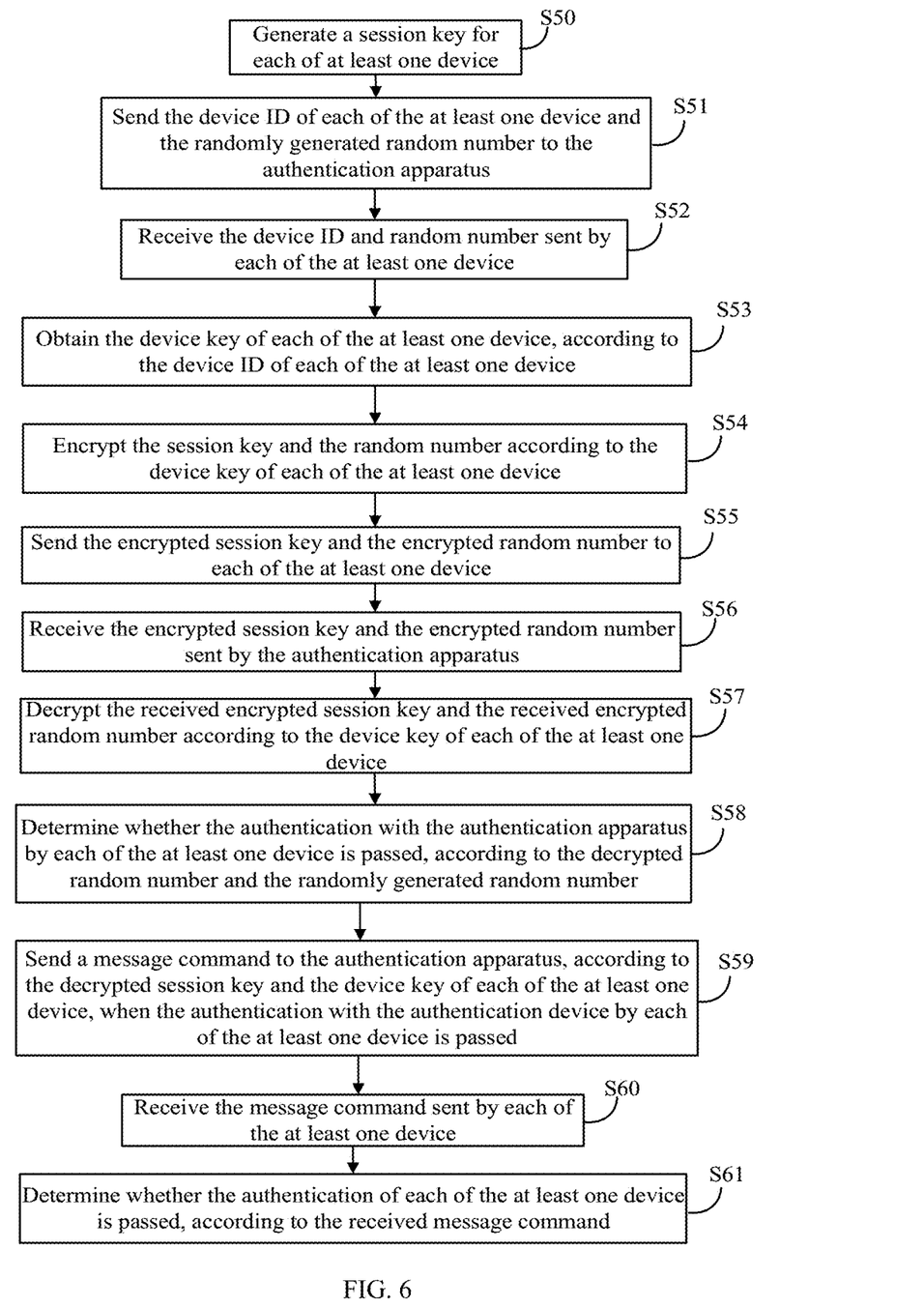
FIG. 6 is a flowchart of another UAV authentication method according to the disclosure.
Figure 7:
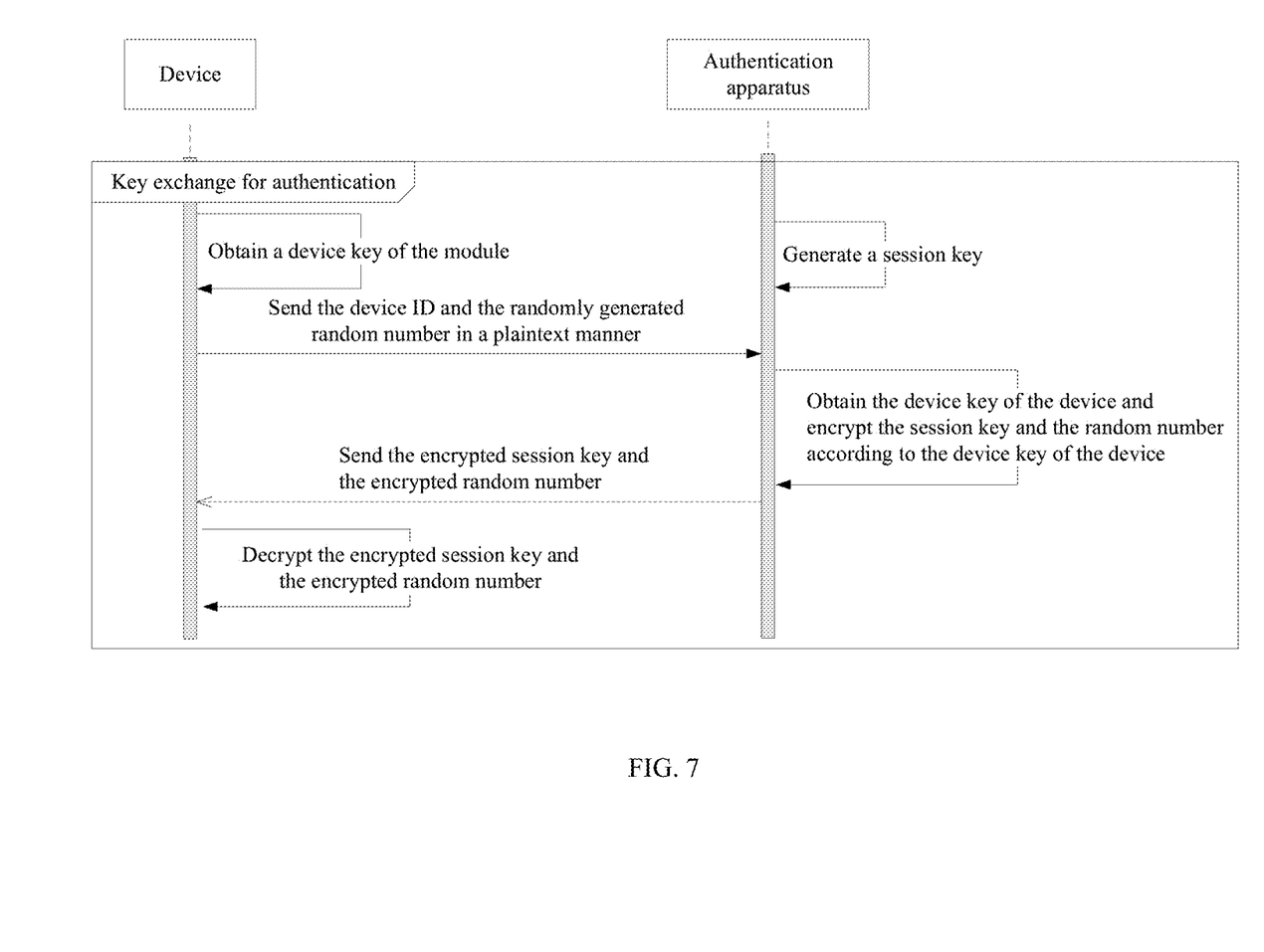
FIG. 7 schematically shows an interaction between at least one device and an authentication apparatus according to the disclosure.

FIG. 6 is a flowchart of another UAV authentication method consistent with the disclosure. FIG. 7 schematically shows an interaction between the at least one device 12 and the authentication apparatus 11 consistent with the disclosure. FIG. 6 and FIG. 7 illustrate implementation processes of the UAV authentication system 10 at the authentication apparatus 11 and each of the at least one device 12.

At S50, when the UAV 1 is powered up or reset, the generating circuit 100 generates a session key for each of the at least one device 12.

At S51, the second sending circuit 106 sends the device ID of each of the at least one device 12 and the randomly generated random number to the authentication apparatus 11.

At S52, the first receiving circuit 101 receives the device ID and random number sent by each of the at least one device 12.

At S53, the acquisition circuit 102 obtains the device key of each of the at least one device 12, according to the device ID of each of the at least one device 12.

At S54, the encryption circuit 103 encrypts the session key and the random number according to the device key of each of the at least one device 12.

At S55, the first sending circuit 104 sends the encrypted session key and the encrypted random number to each of the at least one device 12.

At S56, the second receiving circuit 107 of each of the at least one device 12 receives the encrypted session key and the encrypted random number sent by the authentication apparatus 11.

At S57, the decryption circuit 108 of each of the at least one device 12 decrypts the received encrypted session key and the received encrypted random number according to the device key of each of the at least one device 12.

At S58, the second determination circuit 109 of each of the at least one device 12 determines whether the authentication with the authentication apparatus 11 by each of the at least one device 12 is passed, according to the decrypted random number and the randomly generated random number.

At S59, when the authentication with the authentication apparatus by each of the at least one device 12 is passed, the second sending circuit 106 of each of the at least one device 12 sends a message command to the authentication apparatus 11, according to the decrypted session key and the device key of each of the at least one device 12.

At S60, the first receiving circuit 101 receives the message command sent by each of the at least one device 12.

At S61, the first determination circuit 105 determines whether the authentication of each of the at least one device 12 is passed, according to the received message command.

In some embodiments, the processes at S59-S61 can be omitted.

In some embodiments, the UAV authentication system 10 can divide the at least one device 12 into at least two groups including a group of necessary devices and a group of unnecessary devices. The UAV authentication system 10 can prohibit the UAV 1 from starting, when at least one of the necessary devices fails to pass the authentication. In some embodiments, when all of the at least one device 12 pass the authentication with the authentication apparatus 11 or when at least one necessary device fails to pass the authentication with the authentication apparatus 11, the UAV authentication system 10 can start the UAV 1.

In some embodiments, if the authentication apparatus 11 loses power during the authentication process between the authentication apparatus 11 and each of the at least one device 12, the authentication apparatus 11 can inform each of the at least one device 12 to perform key exchange again using feedback information (such as by returning a feedback value or by broadcasting). When one of the at least one device 12 loses power during the authentication process between the authentication apparatus 11 and each of the at least one device 12, the one of the at least one device 12 can inform the authentication apparatus 11 to perform key exchange again or to resend the session key using feedback information (such as by returning a feedback value or by broadcasting). In some embodiments, the authentication apparatus 11 can be notified to repower-up and perform key exchange again.

In some embodiments, when generating the session key, the authentication apparatus 11 can generate a command sequence number at the same time, encrypt the session key, the random number, and the command sequence number, according to the device key of each of the at least one device 12, and send the encrypted session key, the encrypted random number, and the encrypted command sequence number to each of the at least one device 12. Each of the at least one device 12 can decrypt the received encrypted session key, the received encrypted random number, and the received encrypted command sequence number. The command sequence number can be automatically sent at a preset time interval (e.g., every 20 ms) or every time a command is sent (e.g., between one of the at least one device 12 and another one of the at least one device 12 or between one of the at least one device 12 and the authentication apparatus 11) and can be automatically incremented by a preset value (e.g., one).

In some embodiments, an initial value of the command sequence number can be zero or another preset value. The command sequence number can be automatically incremented each time the command is sent or can be automatically incremented according to the above preset time interval.

In some embodiments, the generated session key and the generated command sequence number can be stored in the storage apparatus 13 or an external storage apparatus for protection. When the authentication apparatus 11 undergoes a warm restart during the authentication process, each of the at least one device 12 can directly read the session key and the command sequence number from the storage apparatus 13 and the process of rekey exchange can be omitted. The command sequence number can be configured to determine whether the message command sent by one of the at least one device 12 or the authentication apparatus 11 to another one of the at least one device 12 is an expired command. When the message command is an expired command, the another one of the at least one device 12 will not respond to the received message command, which will be described in detailed in FIG. 8.

In some embodiments, the flight controller of the UAV 1 can be configured to generate a session key for each functional assembly. Each functional assembly, i.e., each of the above-described at least one device 12, such as a camera, a gimbal, a remote controller, or the like, can be configured to send the device ID of each functional assembly and the randomly generated random number to the flight controller. The flight controller can obtain the device key of each functional assembly according to the device ID, encrypt the session key and the random number according to the device key of each functional assembly, and send the encrypted session key and the encrypted random number to each functional assembly. Each functional assembly can decrypt the received encrypted session key and the received encrypted random number according to the device key of each functional assembly, and determine whether the authentication of the flight controller is passed according to the decrypted random numbers and the decrypted randomly generated random numbers.

Figure 8:
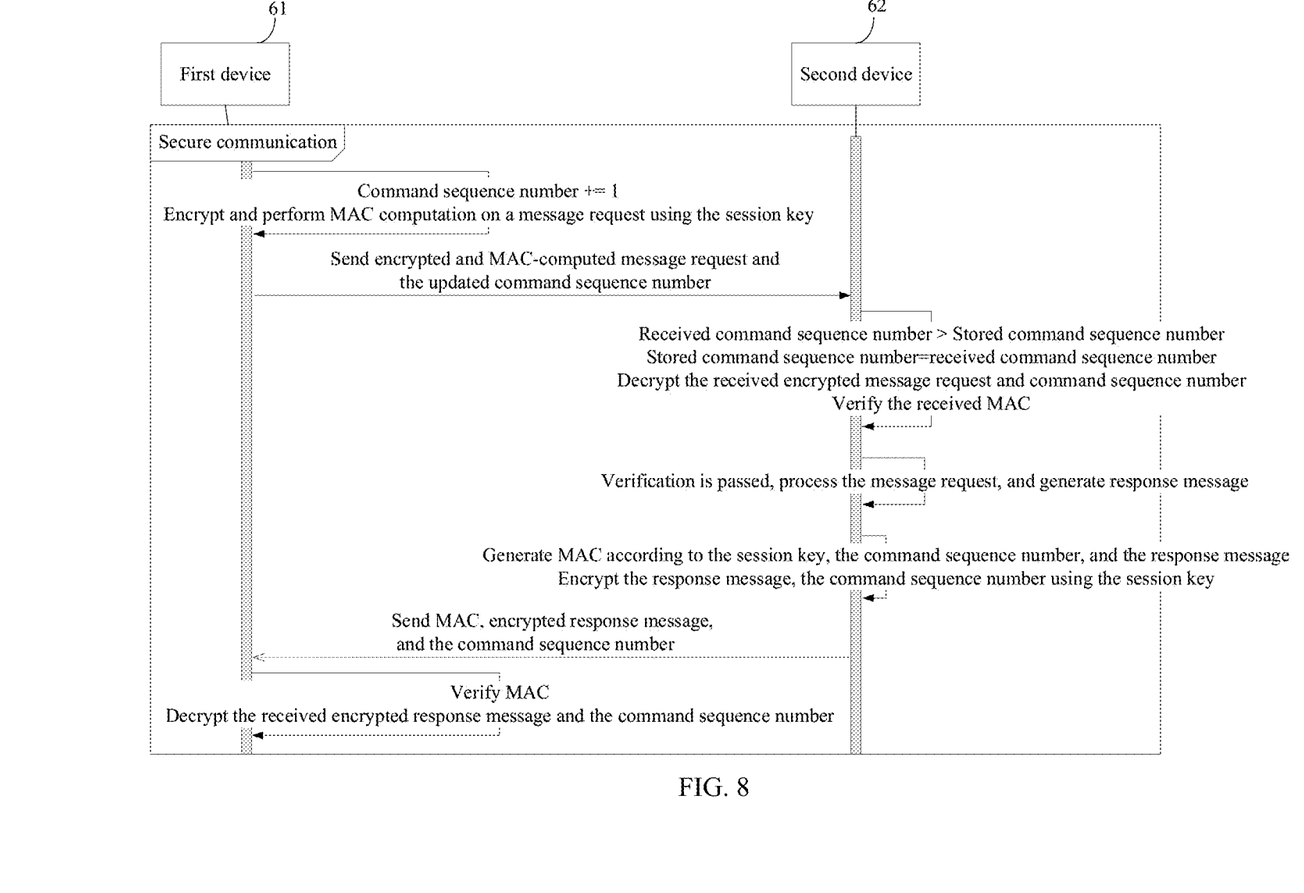
FIG. 8 schematically shows a secure communication between two devices according to the disclosure.

FIG. 8 schematically shows a secure communication between two devices consistent with the disclosure. As shown in FIG. 8, a first device 61 is to establish a communication connection with a second device 62. The first device 61 obtains the session key and the command sequence number. In some embodiment, the first device 61 receives the encrypted session key, the encrypted random number, and the command sequence number sent by the authentication apparatus 11 during the authentication process with the authentication apparatus 11. The first device 61 generates a message request to communicate with the second device 62. The first device 61 updates the acquired command sequence number. The first device 61 uses the session key to encrypt the message request and perform message authorization code (MAC) computation on the message request. The first device 61 sends the encrypted and MAC-computed message request and the updated command sequence number to the second device 62.

In some embodiments, the session key can include an encryption key and a MAC key correspond to the encryption and the MAC computation, respectively. In some embodiments, the session key can include only one of the encryption key and the MAC key. In some other embodiments, the session key can also include a plurality of other types of session keys in addition to the encryption key and the MAC key.

The second device 62 receives a MAC, the encrypted message request, and the updated command sequence number sent by the first device 61. When the received command sequence number is greater than the command sequence number stored in the storage apparatus of the second device 62, the second device 62 updates the stored command sequence number. The second device 62 decrypts the encrypted message request using the session key. The second device 62 verifies the received MAC. When a verification of the received MAC is passed, the second device 62 generates a response message based on the decrypted message request. The second device 62 generates another MAC based on the received command sequence number, the received session key, and the response message. The second device 62 encrypts the response message using the session key. The second device 62 sends the another MAC, the encrypted response message, and the received command sequence number to the first device 61.

When the received command sequence number is less than or equal to the command sequence number stored in the storage apparatus of the second device 62, it indicates that the message request sent by the first device 61 to the second device 62 has been processed and is an expired command. As such, replay attacks can be effectively prevented.

The first device 61 can receive the another MAC generated based on the received command sequence number, the session key, and the response message, the encrypted response message, and the command sequence number sent by the second device 62. The first device 61 can verify the received MAC. When the verification of the MAC is passed, the first device 61 can decrypt the received encrypted response message.

It is intended that the specification and examples be considered as exemplary only and not to limit the scope of the disclosure. Those skilled in the art will be appreciated that any modification or equivalents to the disclosed embodiments are intended to be encompassed within the scope of the present disclosure.

What is claimed is:

1. An authentication method comprising:
generating, by an authentication apparatus of an unmanned aerial vehicle (UAV), a session key;
receiving, by the authentication apparatus from a device of the UAV, a device identification (ID) of the device and a randomly generated random number;
obtaining, by the authentication apparatus, a device key of the device according to the device ID of the device;
encrypting, by the authentication apparatus, the session key and the random number according to the device key of the device;
sending, by the authentication apparatus, the encrypted session key and the encrypted random number to the device; and
receiving, by the authentication apparatus from the device, a message command generated using a decrypted session key and a decrypted random number obtained by the device decrypting the encrypted session key and the encrypted random number.

2. The method of claim 1, further comprising:
determining, by the authentication apparatus, whether an authentication of the device is passed, according to the received message command.

3. The method of claim 2, wherein determining whether the authentication of the device is passed includes:
checking the received message command through a Cyclic Redundancy Check (CRC);
determining the authentication of the device is failed, in response to an error being found; and
determining the authentication of the device is passed, in response to no error being found.

4. The method of claim 2, wherein determining whether the authentication of the device is passed includes:
checking an integrity of the message command by comparing a first message digest of the received message command with a second message digest of the message command sent by the device;
determining the authentication of the device is passed, in response to the first message digest being consistent with the second message digest; and
determining the authentication of the device is failed, in response to the first message digest being inconsistent with the second message digest.

5. The method of claim 1, wherein:
the authentication apparatus corresponds to an authentication key.

6. The method of claim 5, wherein:
the device key of the device is generated according to the device ID of the device and the authentication key.

7. The method of claim 5, wherein obtaining the device key of the device includes:
generating the device key of the device in real time.

8. The method of claim 1, wherein:
the device belongs to one of a plurality of groups of devices; and
each of the groups corresponds to a device type having a device type ID identifying the device type.

9. The method of claim 8, wherein:
the device key of the device is generated according to the device ID of the device, the authentication key, and a device type key of the device type corresponding to the group to which the device belongs.

10. The method of claim 1, wherein:
the device key of the device is pre-programmed in a storage chip of the UAV and/or solidified in firmware of the UAV.

11. The method of claim 10, wherein obtaining the device key of the device includes:
reading the device key of the device from the storage chip, according to the device ID of the device.

12. The method of claim 1, further comprising:
decrypting, by the device according to the device key of the device, the encrypted session key and the encrypted random number; and
determining, by the device according to the decrypted random number and the randomly generated random number, whether the device passes an authentication with the authentication apparatus, including:
determining the authentication with the authentication apparatus is passed in response to the decrypted random number being consistent with the randomly generated random number; and
determining the authentication with the authentication apparatus is failed in response to the decrypted random number being inconsistent with the randomly generated random number.

13. The method of claim 1,
wherein the device belongs to one of at least two groups including a first group of devices of the UAV and a second group of devices of the UAV;
the method further comprising:
prohibiting the UAV from starting, in response to that at least one of the first group of devices fails to pass the authentication with the authentication apparatus or at least one of the first group of devices fails to authenticate the authentication apparatus.

14. The method of claim 1, further comprising:
instructing the device to perform a key exchange using feedback information, in response to the authentication apparatus being out of power.

15. The method of claim 1, further comprising:
generating a command sequence number when the session key is generated;

encrypting the session key, the random number, and the command sequence number, according to the device key of the device; and sending the encrypted session key, the encrypted random number, and the encrypted command sequence number to the device.

16. The method of claim 15, wherein:

the command sequence number is automatically incremented by a preset value at a preset time interval or every time a command is sent.

17. A secure communication method comprising:

obtaining, by a first device, a session key and a command sequence number;

generating, by the first device, a message request to communicate with a second device;

updating, by the first device, the command sequence number;

encrypting, by the first device, the message request and performing message authorization code (MAC) computation on the message request;

sending, by the first device, the encrypted and MAC-computed message request and the updated command sequence number to the second device;

receiving, by the second device, an MAC, the encrypted and MAC-computed message request, and the updated command sequence number that are sent by the first device;

changing, by the second device, a stored command sequence number stored in a storage apparatus to the updated command sequence number, in response to the updated command sequence number being greater than the stored command sequence number;

decrypting, by the second device, the encrypted and MAC-computed message request using the session key to generate a decrypted message request;

verifying, by the second device, the received MAC;

generating, by the second device in response to that a verification of the received MAC is passed, a response message based on the decrypted message request;

generating, by the second device, another MAC, according to the updated command sequence number, the received session key, and the response message;

encrypting, by the second device, the response message using the session key; and sending, by the second device, the another MAC, the encrypted response message, and the updated command sequence number to the first device.

18. The method of claim 17, further including:

receiving, by the first device, the another MAC generated based on the received command sequence number, the session key, and the response message, the encrypted response message, and the command sequence number sent by the second device;

verifying, by the first device, the received another MAC; and decrypting, by the first device, the encrypted response message in response to that the verification of the received another MAC is passed.

19. A flight controller of an unmanned aerial vehicle (UAV), the flight controller being configured to:

generate a session key;

receive a device ID of a functional assembly of the UAV and a random number;

obtain a device key of the functional assembly according to the device ID of the functional assembly;

encrypt the session key and the random number according to the device key of the functional assembly;

send the encrypted session key and the encrypted random number to the functional assembly; and receive a message command generated using a decrypted session key and a decrypted random number obtained by the functional assembly decrypting the encrypted session key and the encrypted random number.

* * * * *